United States Patent
Chen et al.

(10) Patent No.: US 12,436,637 B2
(45) Date of Patent: Oct. 7, 2025

(54) DISPLAY DEVICE AND DISPLAY METHOD

(71) Applicant: AUO Corporation, Hsinchu (TW)

(72) Inventors: Chi-Cheng Chen, Hsinchu (TW);
Chun-Fan Chung, Hsinchu (TW);
Chih-Fu Yang, Hsinchu (TW)

(73) Assignee: AUO Corporation, Hsinchu (TW)

( * ) Notice: Subject to any disclaimer, the term of this patent is extended or adjusted under 35 U.S.C. 154(b) by 0 days.

(21) Appl. No.: 18/885,768

(22) Filed: Sep. 16, 2024

(65) Prior Publication Data

US 2025/0264950 A1    Aug. 21, 2025

(30) Foreign Application Priority Data

Feb. 17, 2024   (TW) .................... 113105616

(51) Int. Cl.
*G06F 3/041* (2006.01)
*G09G 3/20* (2006.01)

(52) U.S. Cl.
CPC ............. *G06F 3/0412* (2013.01); *G09G 3/20* (2013.01); *G09G 2320/041* (2013.01)

(58) Field of Classification Search
CPC ... G06F 3/0412; G09G 3/20; G09G 2320/041
See application file for complete search history.

(56) References Cited

U.S. PATENT DOCUMENTS

| 2019/0155450 | A1* | 5/2019 | Kim | ................. G01L 1/146 |
| 2020/0033979 | A1* | 1/2020 | Sauer | ................. G06F 3/044 |
| 2024/0118757 | A1 | 4/2024 | Yi et al. | |
| 2025/0173029 | A1* | 5/2025 | Lee | ................. G06F 3/04164 |

FOREIGN PATENT DOCUMENTS

| CN | 112133197 | 12/2020 |
| CN | 114201073 | 3/2022 |
| TW | 202018693 | 5/2020 |
| TW | 202406407 | 2/2024 |

* cited by examiner

*Primary Examiner* — Peter D Mcloone
(74) *Attorney, Agent, or Firm* — JCIPRNET

(57) ABSTRACT

A display device and a display method are provided. The display device includes a first touch pad and a first temperature sensing circuit. The first touch pad is configured to sense and generate a first touch signal. The first temperature sensing circuit is configured to sense and generate a first temperature sensing signal corresponding to an operating temperature. A multiplexer is coupled to the first touch pad and the first temperature sensing circuit through a common signal line. The multiplexer is configured to output the first touch signal and the first temperature sensing signal in different time intervals.

14 Claims, 5 Drawing Sheets

DISPLAY DEVICE AND DISPLAY METHOD

CROSS-REFERENCE TO RELATED APPLICATION

This application claims the priority benefit of Taiwan application serial no. 113105616, filed on Feb. 17, 2024. The entirety of the above-mentioned patent application is hereby incorporated by reference herein and made a part of this specification.

BACKGROUND

Technical Field

The disclosure relates to a device and a method, and particularly relates to a display device and a display method.

Description of Related Art

In general mini LEDs, uLEDs, or similar display device applications, the luminous color and color temperature of the LED will drift with the operating temperature. In this way, when the display device continues to display images with different grayscale brightness in different areas for a long time, the areas will produce corresponding temperature changes due to different driving currents, such that the display area with a large current will have a large temperature change, which eventually causes the display areas to have different color drifts due to different temperature changes.

SUMMARY

The disclosure provides a display device and a display method that may eliminate the color drift caused by the temperature.

A display device of the disclosure includes a first touch pad and a first temperature sensing circuit. The first touch pad is configured to sense and generate a first touch signal. The first temperature sensing circuit is configured to sense and generate a first temperature sensing signal corresponding to an operating temperature. A multiplexer (MUX) is connected to the touch pad and the temperature sensing circuit through a common signal line. The multiplexer is configured to output the first touch signal and the first temperature sensing signal in different time intervals.

A display method of the disclosure is adapted for controlling a display device. The display method includes the following steps. A first touch signal is sensed and generated through a first touch pad. A first temperature sensing signal corresponding to an operating temperature is sensed and generated through a first temperature sensing circuit. A common signal line connected to the touch pad and the temperature sensing circuit is provided, and the first touch signal and the first temperature sensing signal are output through a multiplexer (MUX) in different time intervals.

Based on the above, the display device and the display method of the disclosure may sense temperature information and adjust the provided display data value accordingly, thereby eliminating the color shift caused by the temperature.

DESCRIPTION OF THE EMBODIMENTS

Figure 1:
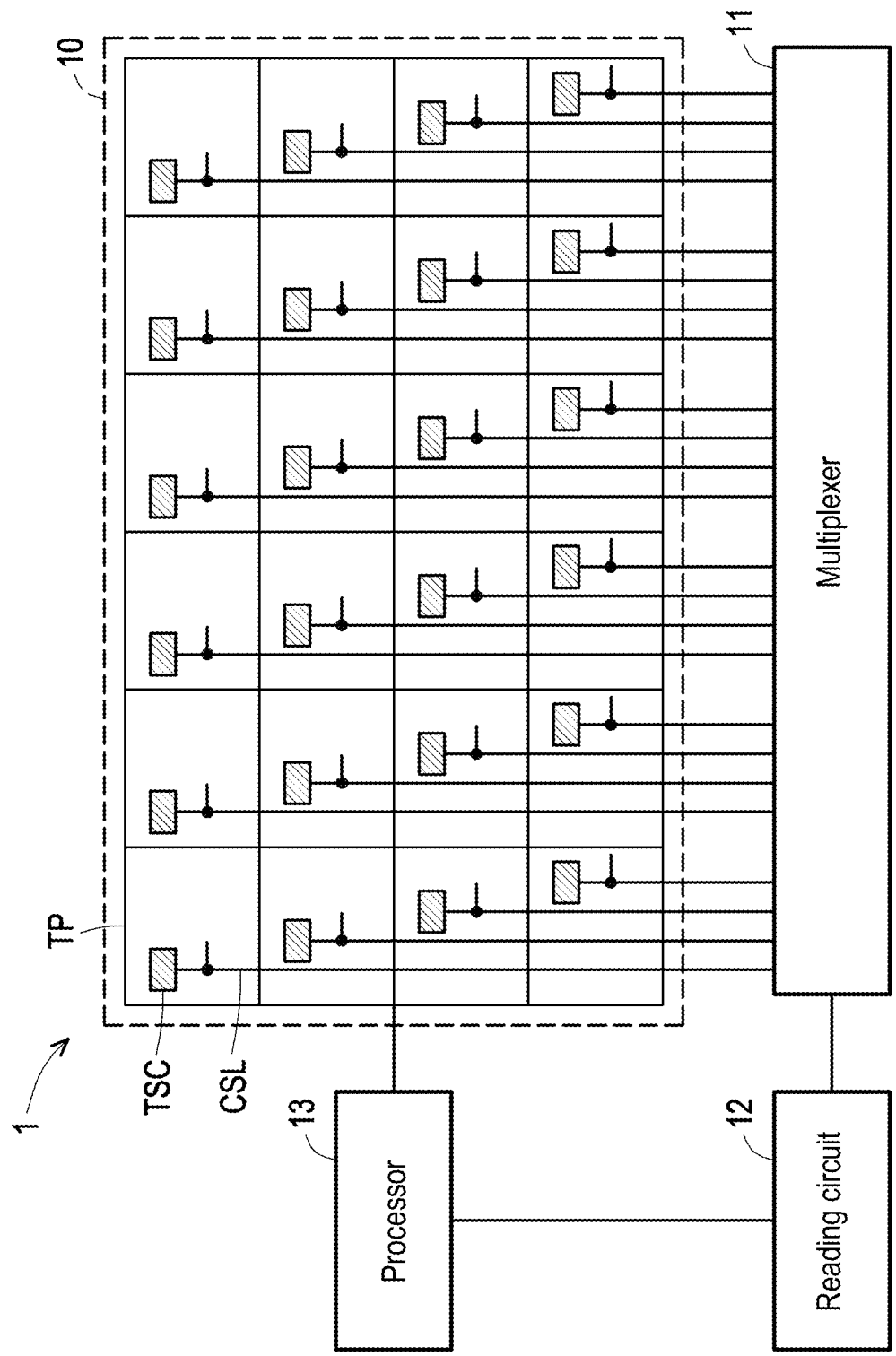
FIG. 1 is a schematic block diagram of a display device according to an embodiment of the disclosure.

FIG. 1 is a schematic block diagram of a display device 1 according to an embodiment of the disclosure. The display device 1 includes a display panel 10, a multiplexer 11, a reading circuit 12, and a processor 13. In the embodiment, the display panel 10 of the display device 1 includes a plurality of touch pads TP and a plurality of temperature sensing circuits TSC. The touch pad TP and the temperature sensing circuit TSC may be disposed in an array in an active area of the display device 1. Each temperature sensing circuit TSC may be disposed below the corresponding touch pad TP, and shares a same common signal line CSL with the touch pad TP to be connected to the multiplexer 11 through the common signal line CSL. The multiplexer 11 may output a touch signal and a temperature sensing signal to the reading circuit 12 in different time intervals, which are then provided to the processor 13, so that the processor 13 obtains the touch and temperature information on the display panel 10.

To put it simply, the display device 1 may obtain the temperature information on the display panel 10 by disposing the temperature sensing circuit TSC, so that the processor 13 may adjust the display data value provided to a pixel array (not shown in FIG. 1) in the display panel based on the temperature information to eliminate the color shift caused by the temperature. On the other hand, since only the temperature sensing circuit TSC is additionally disposed in the hardware architecture, it may be implemented with minor changes to the existing architecture, thereby reducing the difficulty of design and integration.

Specifically, the display panel 10 includes an array formed by the touch pads TP and the temperature sensing circuits TSC. The touch pad TP may be configured to sense the user's touch to generate the corresponding touch signal. The temperature sensing circuit TSC may be configured to sense the operating temperature of the adjacent area thereof and generate the corresponding temperature sensing signal based on the operating temperature. Further, the temperature sensing circuit TSC may be disposed below the corresponding touch pad TP, and share the same common signal line CSL with the touch pad TP to be connected to the multiplexer 11 to provide the touch signal and the temperature sensing signal to the multiplexer 11. Although not explicitly shown, the display panel 10 is also disposed with the pixel array for displaying an image. The pixel array may be disposed to be overlapped with the touch pad TP and the temperature sensing circuit TSC in the same active area, so that the temperature sensing circuit TSC may be configured to sense the operating temperature of the pixels in the adjacent area thereof.

Furthermore, the multiplexer 11 may provide the touch signal and the temperature sensing signal to the reading circuit 12 respectively in different and non-overlapping time intervals. The reading circuit 12 may respectively determine whether the user has touched the touch information of the touch pad TP and the temperature information of the adjacent area of the temperature sensing circuit TSC based on the touch signal and the temperature sensing signal. The reading circuit 12 may provide the determined touch information and temperature information to the processor 13, so that the processor 13 performs corresponding operations based on the touch information, and adjusts the display data value provided to the pixel array based on the temperature information, thereby eliminating the color shift caused by the temperature.

Figure 2:
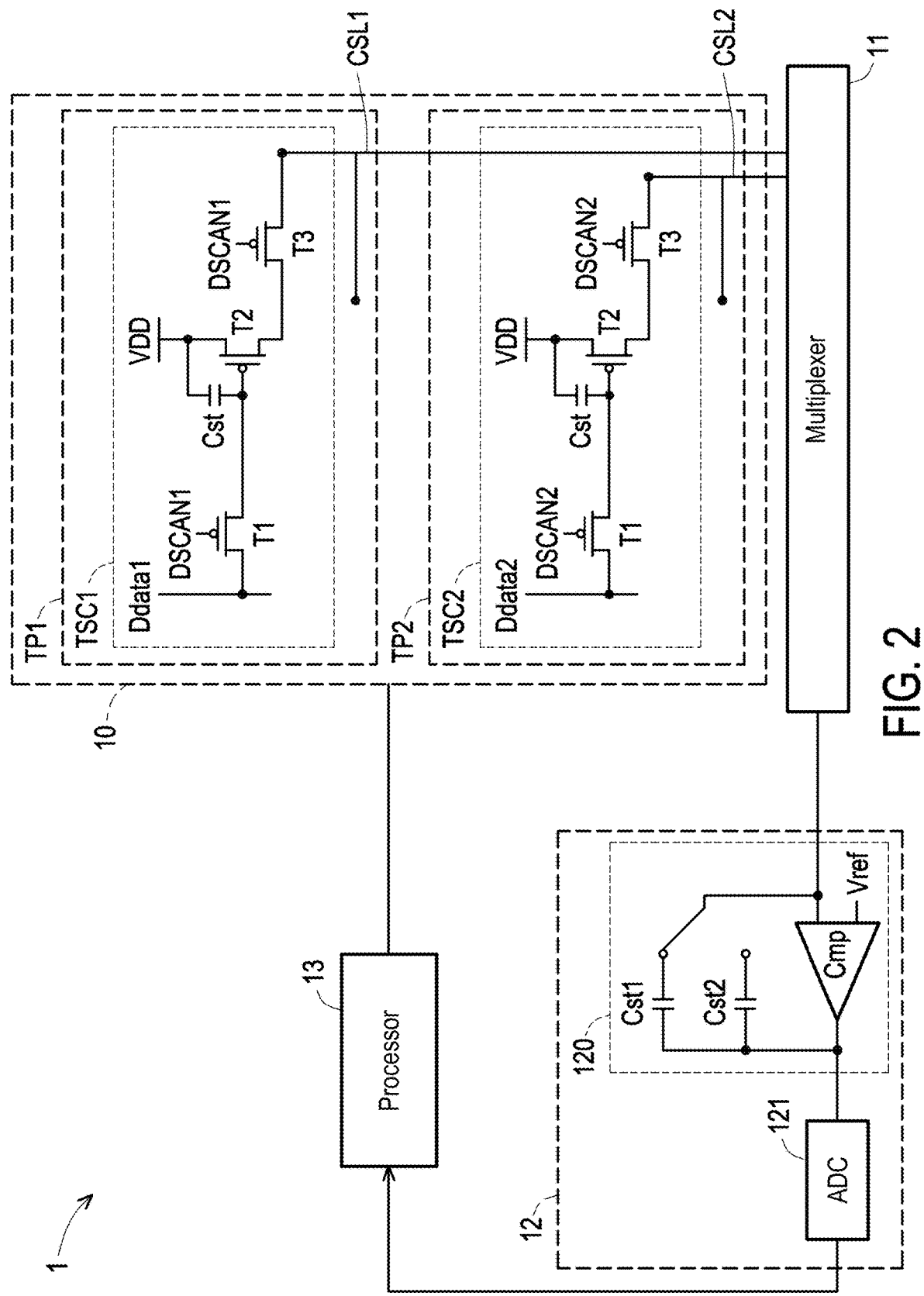
FIG. 2 is a detailed schematic circuit diagram of the display device in FIG. 1.

FIG. 2 is a detailed schematic circuit diagram of the display device 1 in FIG. 1. Since the more detailed structure of some circuits in the display device 1 is shown in FIG. 2, for the sake of simplicity of the drawing, only two touch pads TP1 and TP2 and two temperature sensing circuits TSC1 and TSC2 are shown in the display panel 10, but different numbers of touch pads and temperature sensing circuits should fall within the scope of the modified embodiments of the disclosure. Specifically, the touch pad TP1 and the temperature sensing circuit TSC1 are both connected to a common signal line CSL1. The touch pad TP2 and the temperature sensing circuit TSC2 are both connected to a common signal line CSL2. The multiplexer 11 is coupled to the common signal lines CSL1 and CSL2. The multiplexer 11 may selectively connect one of the common signal lines CSL1 and CSL2 to the reading circuit 12 based on a control signal, so that the reading circuit 12 receives the touch signal and the temperature sensing signal, and determines the corresponding touch information and temperature sensing information accordingly. Finally, the processor 13 may receive the touch information to perform corresponding touch operations and receive the temperature sensing information to adjust the display data value provided to a pixel circuit accordingly.

In detail, each temperature sensing circuit has a same circuit structure. The temperature sensing circuit may be configured to receive a test signal to generate the temperature sensing signal corresponding to the operating temperature of the adjacent area. In some embodiments, the temperature sensing circuit may have a circuit structure similar to the circuit structure of each pixel circuit. In this way, the test signal received by the temperature sensing circuit may be, for example, a preset display data value. The temperature sensing circuit may generate a driving signal related to the operating temperature of the adjacent area as the temperature sensing signal based on the preset display data value, so that the subsequent reading circuit 12 may determine the temperature information through reading the current value of the temperature sensing signal.

Specifically, the temperature sensing circuit TSC1 includes transistors T1 to T3 and a capacitor Cst. The transistor T1 has a first end (such as a drain) for receiving a test signal Ddata1, a second end (such as a source), and a control end (such as a gate) for receiving a selection signal DSCAN1. The transistor T2 has a first end (such as a drain) for receiving an operating voltage VDD, a second end (such as a source), and a control end (such as a gate) coupled to the second end (such as the source) of the transistor T1. The transistor T3 has a first end (such as a drain) coupled to the second end (such as the source) of the transistor T2, a second end (such as a source) coupled to the common signal line CSL1 to output the temperature sensing signal, and a control end (such as a gate) for receiving the selection signal DSCAN1. The capacitor is coupled between the first end (such as the drain) and the control end (such as the gate) of the transistor T2. In addition, the temperature sensing circuit TSC2 has a circuit structure similar to the circuit structure of the temperature sensing circuit TSC1, except that the temperature sensing circuit TSC2 receives a test signal Ddata2 and a selection signal DSCAN2. In this way, the temperature sensing circuits TSC1 and TSC2 may receive the test signals Ddata1 and Ddata2, and based on the control of the selection signals DSCAN1 and DSCAN2, the temperature sensing signal is provided to the multiplexer 11 through the common signal lines CSL1 and CSL2 for subsequent reading. In other embodiments, the temperature sensing circuit may be, for example, a thermistor or other circuit whose output signal is related to the temperature. In this way, the temperature sensing circuit may generate a temperature sensing signal related to the operating temperature through a simpler circuit structure.

The reading circuit 12 includes an integrator 120 and an analog to digital converter (ADC) 121. The integrator 120 includes capacitors Cst1 and Cst2, and a comparator Cmp. The capacitors Cst1 and Cst2 are connected in parallel between the output terminal and the negative input terminal of the comparator Cmp through negative feedback, and the comparator Cmp receives a reference voltage Vref at the positive input terminal. In this way, the integrator 120 may integrate the current value of the temperature sensing signal through the switch selection capacitors Cst1 and Cst2, and the analog voltage value of the integration result is converted into a digital signal through the ADC 121 and then output to the processor 13 as the temperature information for subsequent adjustment operations of the display data value.

After receiving the temperature information, the processor 13 may determine the operating temperature of the areas adjacent to the temperature sensing circuits TSC1 and TSC2 by looking up the table. In some embodiments, the test signal Ddata1 received by the temperature sensing circuit TSC1 and the test signal Ddata2 received by the temperature sensing circuit TSC2 may be the same or different. In this way, when the test signals Ddata1 and Ddata2 are the same, the processor 13 may store the lookup table corresponding to a single test signal, thereby reducing hardware requirements.

The processor 13 may be, for example, a central processing unit (CPU), or other programmable general-purpose or special-purpose micro control units (MCUs), a microprocessor, a digital signal processor (DSP), a programmable controller, an application specific integrated circuit (ASIC), a graphics processing unit (GPU), an arithmetic logic unit (ALU), a complex programmable logic device (CPLD), a field programmable gate array (FPGA), any other kind of integrated circuit, state machine, advanced RISC machine (ARM)-based processor, or other similar components, or a combination thereof. Alternatively, the processor 13 may be, for example, a hardware circuit described and implemented in a hardware description language (HDL).

Generally speaking, the display device 1 obtains the temperature information by disposing the temperature sensing circuits TSC1 and TSC2 in the display panel 10, so that the processor 13 may adjust the display data value to eliminate the color shift caused by the temperature.

Figure 3A:
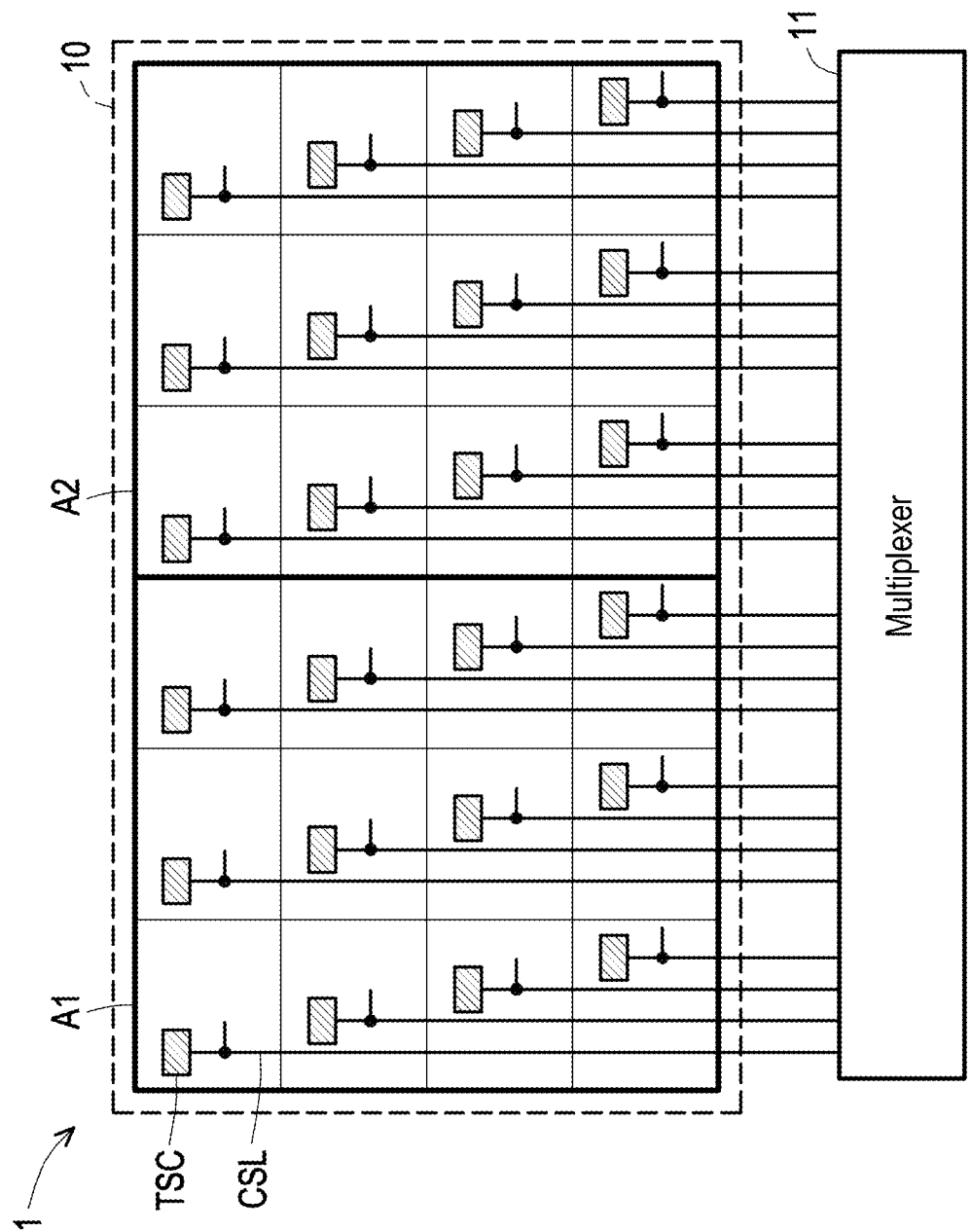
FIG. 3A is a schematic diagram of partitioning a display panel according to an embodiment of the disclosure.

FIG. 3A is a schematic diagram of partitioning of the display panel 10 according to an embodiment of the disclosure. As shown in FIG. 3A, the display panel 10 is divided into partitions A1 and A2 based on the column direction. In the embodiment, the partitions A1 and A2 may perform the same or different sensing operations at the same time.

Specifically, the partitions A1 and A2 may perform different sensing operations in the same time interval. For example, in the first time interval, the temperature sensing circuit in the partition A1 may provide the temperature sensing signal to the multiplexer 11, and the touch pad in the partition A2 may provide the touch signal to the multiplexer 11. In the first time interval, the multiplexer 11 may sequentially provide the temperature sensing signal provided by the temperature sensing circuit in the partition A1 and the touch signal sensed by the touch pad in the partition A2 to the subsequent reading circuit 12 based on the control signal. Then, in the second time interval after the first time interval, the touch pad in the partition A1 may provide the touch signal to the multiplexer 11, and the temperature sensing circuit in the partition A2 may provide the temperature sensing signal to the multiplexer 11. In the second time interval, the multiplexer 11 may sequentially provide the touch signal sensed by the touch pad in the partition A1 and the temperature sensing signal provided by the temperature sensing circuit in the partition A2 to the subsequent reading circuit 12 based on the control signal.

In addition, the partitions A1 and A2 may perform the same sensing operation in the same time interval. For example, in the first time interval, the touch pads in the partitions A1 and A2 may provide touch signals to the multiplexer 11, and in the first time interval, the multiplexer 11 may sequentially provide the temperature sensing signals provided by the temperature sensing circuits in the partitions A1 and A2 to the subsequent reading circuit 12 based on the control signal. Then, in the second time interval after the first time interval, the temperature sensing circuits in the partitions A1 and A2 may provide the temperature sensing signals to the multiplexer 11. In the second time interval, the multiplexer 11 may sequentially provide the temperature sensing signals provided by the temperature sensing circuits in the partitions A1 and A2 to the subsequent reading circuit 12 based on the control signal.

Figure 3B:
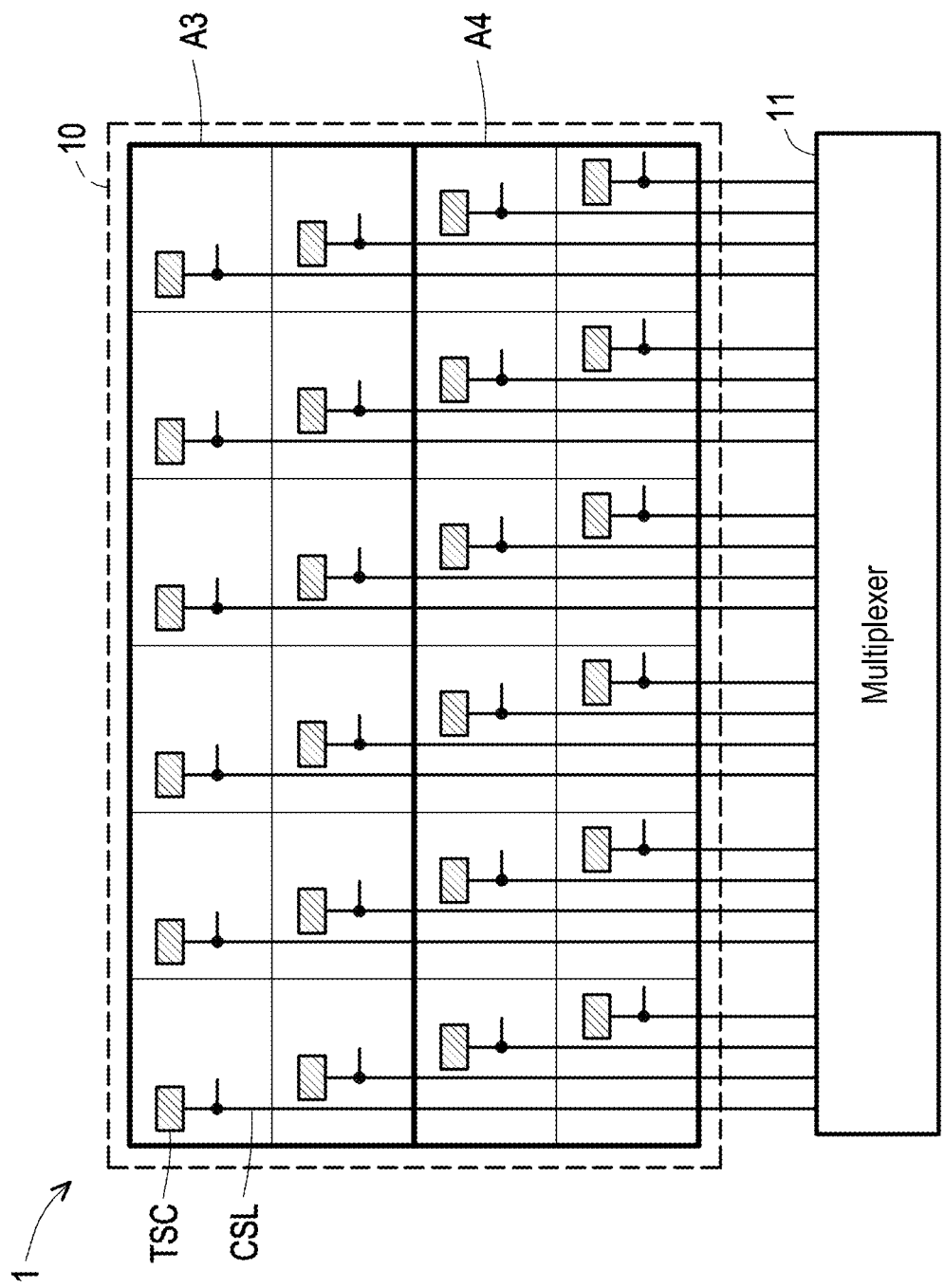
FIG. 3B is a schematic diagram of partitioning a display panel according to an embodiment of the disclosure.

FIG. 3B is a schematic diagram of partitioning the display panel 10 according to an embodiment of the disclosure. As shown in FIG. 3B, the display panel 10 is divided into partitions A3 and A4 based on the column direction. In the embodiment, the partitions A3 and A4 may perform the same or different sensing operations at the same time. Regarding the content of performing the same or different sensing operations in the partitions A3 and A4, please refer to the explanatory paragraph of FIG. 3A above, and detail thereof is not repeated here.

Figure 4:
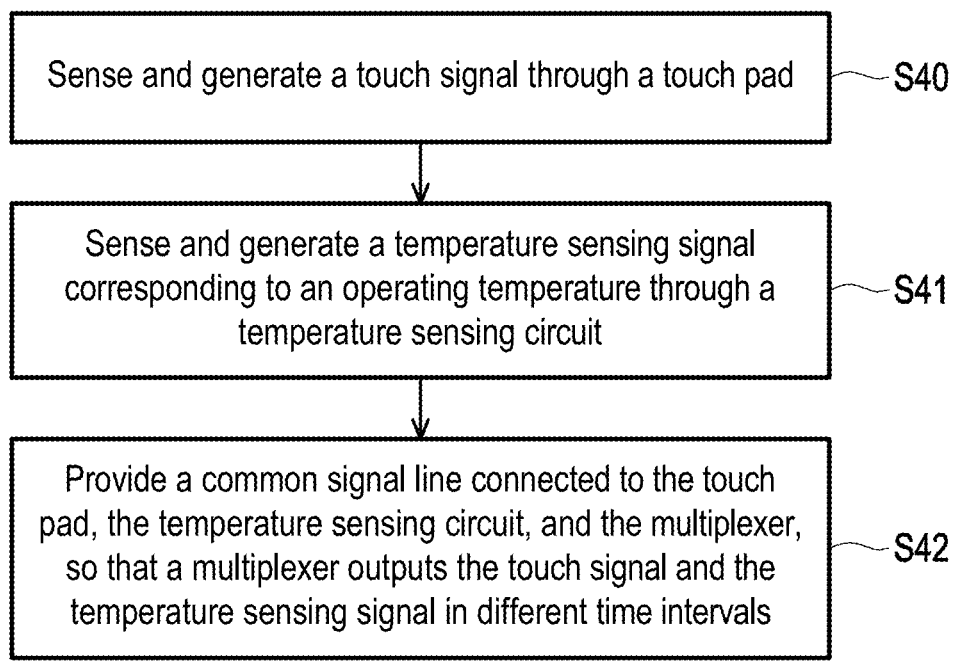
FIG. 4 is a flowchart of a display method according to an embodiment of the disclosure.

FIG. 4 is a flowchart of a display method according to an embodiment of the disclosure. The display method in FIG. 4 may be executed through the display device 1 in FIG. 1 and FIG. 2. The display method in FIG. 4 includes steps S40 to S42.

In step S40, the display device 1 may sense and generate the touch signal through the touch pad. In step S41, the display device 1 may sense and generate the temperature sensing signal corresponding to the operating temperature through the temperature sensing circuit. In step S42, the display device 1 may be provided with a common signal line connected to the touch pad, the temperature sensing circuit, and the multiplexer, so that the multiplexer outputs the touch signal and the temperature sensing signal in different time intervals.

To sum up, the display device and the display method of the disclosure may obtain the temperature information of the adjacent area by disposing the temperature sensing circuit in the display panel, and the processor 13 may adjust the display data value based on the temperature information to eliminate the color shift caused by the temperature, thereby providing an ideal visual experience.

What is claimed is:

1. A display device, comprising:
    a first touch pad, configured to sense and generate a first touch signal;
    a first temperature sensing circuit, configured to sense and generate a first temperature sensing signal corresponding to an operating temperature; and
    a multiplexer (MUX), connected to the first touch pad and the first temperature sensing circuit through a common signal line, wherein the multiplexer is configured to output the first touch signal and the first temperature sensing signal in different time intervals,
    a second touch pad, configured to sense and generate a second touch signal; and
    a second temperature sensing circuit, configured to sense and generate a second temperature sensing signal,
    wherein the multiplexer outputs the first temperature sensing signal and the second touch signal in a first time interval, and the multiplexer outputs the first touch signal and the second temperature sensing signal in a second time interval.

2. The display device according to claim 1, wherein the first temperature sensing circuit is disposed below the first touch pad.

3. The display device according to claim 1, wherein the first temperature sensing circuit is configured to receive a test signal to generate the first temperature sensing signal corresponding to the operating temperature.

4. The display device according to claim 3, wherein the first temperature sensing signal generated by the first temperature sensing circuit has a current value related to the operating temperature.

5. The display device according to claim 4, further comprising:
    a reading circuit, coupled to the multiplexer, wherein the reading circuit is configured to read the current value of the first temperature sensing signal through the multiplexer to determine temperature information corresponding to the operating temperature.

6. The display device according to claim 5, wherein the reading circuit comprises:
    an integrator, configured to integrate the current value of the first temperature sensing signal to generate an integration result; and
    an analog to digital converter (ADC), configured to generate the temperature information corresponding to the integration result.

7. The display device according to claim 4, wherein the first temperature sensing circuit comprises:
    a first transistor, having a first end for receiving the test signal, a second end, and a control end for receiving a selection signal;
    a second transistor, having a first end for receiving an operating voltage, a second end, and a control end coupled to the second end of the first transistor;
    a third transistor, having a first end coupled to the second end of the second transistor, a second end for outputting the first temperature sensing signal, and a control end for receiving the selection signal; and
    a capacitor, coupled between the first end and the control end of the second transistor.

8. The display device according to claim 1, wherein the multiplexer outputs the first touch signal in a touch time interval and outputs the first temperature sensing signal in a temperature sensing time interval that does not overlap with the touch time interval.

9. A display method adapted for controlling a display device, the display method comprising:
    sensing and generating a first touch signal through a first touch pad, and sensing and generating a second touch signal through a second touch pad;

sensing and generating a first temperature sensing signal corresponding to an operating temperature through a first temperature sensing circuit, and sensing and generating a second temperature sensing signal through a second temperature sensing circuit;

providing a common signal line connected to the first touch pad and the first temperature sensing circuit, and outputting the first touch signal and the first temperature sensing signal in different time intervals through a multiplexer (MUX); and outputting the first temperature sensing signal and the second touch signal through the multiplexer in a first time interval, and outputting the first touch signal and the second temperature sensing signal through the multiplexer in a second time interval.

10. The display method according to claim 9, wherein the first temperature sensing circuit is disposed below the first touch pad.

11. The display method according to claim 9, comprising receiving a test signal through the first temperature sensing circuit to generate the first temperature sensing signal corresponding to the operating temperature.

12. The display method according to claim 11, wherein the first temperature sensing signal generated through the first temperature sensing circuit has a current value related to the operating temperature.

13. The display method according to claim 12, further comprising:

using a reading circuit to read the current value of the first temperature sensing signal through the multiplexer to determine temperature information corresponding to the operating temperature.

14. The display method according to claim 9, wherein the multiplexer outputs the first touch signal in a touch time interval, and outputs the first temperature sensing signal in a temperature sensing time interval that does not overlap with the touch time interval.

* * * * *